(12) United States Patent
Renaud

(10) Patent No.: US 7,433,917 B2
(45) Date of Patent: Oct. 7, 2008

(54) METHOD AND APPARATUS FOR USING JAVA DYNAMIC PROXIES TO INTERFACE TO GENERIC, BEAN-LIKE MANAGEMENT ENTITIES

(75) Inventor: Benjamin Jean-Baptiste Renaud, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 761 days.

(21) Appl. No.: 10/255,422

(22) Filed: Sep. 26, 2002

(65) Prior Publication Data

US 2003/0069969 A1    Apr. 10, 2003

Related U.S. Application Data

(60) Provisional application No. 60/325,863, filed on Sep. 28, 2001.

(51) Int. Cl.
*G06F 15/16* (2006.01)
*G06F 9/44* (2006.01)
*G06F 3/00* (2006.01)

(52) U.S. Cl. .................. 709/203; 717/164; 719/315

(58) Field of Classification Search .......... 709/203; 717/164; 719/315
See application file for complete search history.

(56) References Cited

U.S. PATENT DOCUMENTS

| | | | | |
|---|---|---|---|---|
| 6,011,918 A | * | 1/2000 | Cohen et al. ............... | 717/106 |
| 6,157,960 A | * | 12/2000 | Kaminsky et al. ........... | 719/315 |
| 6,182,153 B1 | * | 1/2001 | Hollberg et al. ............. | 719/315 |
| 6,182,155 B1 | * | 1/2001 | Cheng et al. ................ | 719/315 |
| 6,269,373 B1 | | 7/2001 | Apte et al. .................. | 707/10 |
| 6,351,467 B1 | * | 2/2002 | Dillon ....................... | 370/432 |
| 6,457,065 B1 | | 9/2002 | Rich et al. .................. | 709/328 |
| 6,874,020 B1 | * | 3/2005 | Da Palma et al. ........... | 709/223 |
| 6,901,588 B1 | * | 5/2005 | Krapf et al. ................ | 717/164 |
| 2002/0032783 A1 | * | 3/2002 | Tuatini ....................... | 709/229 |

* cited by examiner

*Primary Examiner*—William C. Vaughn, Jr.
*Assistant Examiner*—Ranodhi N Serrao
(74) *Attorney, Agent, or Firm*—Fliesler Meyer LLP

(57) ABSTRACT

Dynamic management proxies provide type-safe, intuitive, and flexible interfaces to management entities. In an embodiment, a strongly-typed user interface is defined for each management entity. The dynamic proxy receives user requests via this user interface. The dynamic proxies converts user requests into generic requests in compliance with the management entities generic interface. The generic requests are communicated to the management entity via the generic interface. Dynamic management proxies are created at runtime. This allows the management interface to be seamlessly extended.

40 Claims, 3 Drawing Sheets

METHOD AND APPARATUS FOR USING JAVA DYNAMIC PROXIES TO INTERFACE TO GENERIC, BEAN-LIKE MANAGEMENT ENTITIES

STATEMENT OF PRIORITY

This application claims priority under 35 U.S.C. §119(e) from U.S. Provisional Patent Application Ser. No. 60/325,863, filed Sep. 28, 2001, and entitled "Method and Apparatus for Using Java Dynamic Proxies to Interface to Generic, Bean-Like Management Entities." The cited application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to an apparatus for interfacing with management entities across a distributed computing environment.

BACKGROUND OF THE INVENTION

A distributed computing environment is comprised of a group of networked computers working in concert to provide a variety of computing services. In this type of computing environment, software applications are separated into many application components. These components are distributed across the network of computers, so that different components may be executed by different computers within the distributed environment. The application components are designed to effectively operate in a distributed environment. The advantage of designing applications for a distributed computing platform include increased scalability to accommodate a large numbers of users, increased reliability, and efficient use of computing resources.

One example of a distributed computing environment is the Java™ 2platform, Enterprise Edition (J2EE) architecture, which was developed by Sun Microsystems. J2EE applications are comprised of primarily of Enterprise Java™ Beans (EJB), which are self-contained, reusable application components written in the Java™ programming language. The specification for the J2EE architecture is described in Java™ 2 Platform Enterprise Edition Specification, v1.3, available at http://java.sun.com/j2ee/j2ee-1_3-pfd4-spec.pdf and incorporated by reference herein.

In the J2EE architecture, application components are executed within an application server program installed on each computer in a distributed computing environment. The application components for an application may be spread over many application servers within the distributed computing environment, or concentrated within a single application server located on a single computer.

The J2EE application server program provides low-level functionality needed by application components in a distributed programming environment. The functions provided by the J2EE application server program include enabling communication between the distributed application components, as well communication between different applications located within the distributed computing environment or outside this environment. The application server handles system resources, threads, memory, database connections, security, client connectivity, and transaction management. By integrating these functions into the application server, the J2EE platform allows application developers to concentrate on implementing the business logic of the application, rather than low-level functionality required by distributed applications.

As with any large-scale system, proper configuration and continuous monitoring of the distributed computing environment is essential to the system's successful operation. For example, a system administrator may need to monitor runtime statistics of the distributed computing environment in order to prevent a component of the environment from failing. Examples of such statistics include memory usage, the number of users, or the number of transactions. When one component of the distributed computing environment fails, the system administrator may need to reconfigure other portions of the distributed computing environment to compensate. At the same time, the system administrator may be able to reconfigure and repair the failed component. All of these tasks may be done with management software integrated into the distributed computing environment. In J2EE distributed computing environments, the application server may provide management resources for controlling the configuration and operation of J2EE applications and their respective components.

Despite its advantages in scalability, reliability, and efficiency, a distributed computing environment can be difficult to manage. Each of the numerous components of the distributed computing environment may need to be separately configured and monitored. With a large application, this presents thousands of different attributes that must be managed.

One way of efficiently managing a distributed computing environment is through the development of customized management software. In order to facilitate the development of management software, various standard system management protocols have been developed. These protocols allow management software to send and receive management information to any application or system component that has implemented the management protocol. Examples of management interfaces include the Simple Network Management Protocol (SNMP) and the Web-Based Enterprise Management (WBEM) standard. These management interfaces are independent of any particular type of computing platform.

Within the Java™ programming language, the Java™ Management Extensions (JMX) define a Java™-based architecture, API, and services for application and system management. JMX allows Java™ applications to become manageable without substantial modification. The specification for the Java™ Management Extensions standard is located at http://java.sun.com/aboutJava/communityprocess/final/jsr003/index.html and is incorporated herein by reference. Since JMX is integrated into the Java™ programming language, JMX can fully utilize the functionality of other existing Java™ APIs, such as Java™ Naming and Directory Interface (JNDI), Java™ Database Connectivity (JDBC), and Java™ Transaction Services (JTS). Further, JMX can be integrated with other management protocols such as SNMP and WBEM, enabling uniform management of both Java™ and non-Java™ applications.

FIG. 1 shows the basic JMX architecture implemented in the J2EE platform. Implementations in other Java™ platforms, such as Embedded Java™, follow a similar model. J2EE Application Server 100 executes J2EE components, such as EJBs. Additionally, the Application Server 100 contains Managed Beans (MBeans) 105, 110, and 115. Application Server 100 may have any number of MBeans. Each MBean represents a different manageable resource. Examples of manageable resources may include an implementation of a service, an application, or a device. Additionally, MBeans 105, 110, and 115 may represent MBeans for manageable resources associated with Application Server 100. Examples of manageable resources associated with application server 100 include network resources, such as the listen port, security settings, such as encryption levels, and run-time operations, such as server shutdowns, startups, and suspends.

MBeans are Java™ objects with attributes and methods. When an MBean's methods are invoked or an MBean's attribute are altered, the corresponding manageable resource will be affected accordingly. MBeans 105, 110, 115 are registered with MBean Server 130. MBean Server 130 is also located on Application Server 100. In an alternate embodiment, MBean Server 130 is located on a remote server. In a further variation, MBeans may be registered with multiple MBean Servers. MBean Server 130 directly controls its registered MBeans and makes them available to remote management applications. The MBean Server 130 includes a set of services for managing MBeans. These services include communication to and from each MBean, as well as services for creating and removing MBeans.

MBean Server 130 also communicates information to and from Management Applications 140, 150 and 160. Management Application 140 is a Java™ application integrated into the Application Server 100, while Management Applications 150 and 160 are remote applications. The remote Management Applications 150 and 160 may be located on a Java™ platform or an external, non-Java™ platform. Management Application 150 uses a non-JMX management protocol, such as SNMP or WBEM. MBean Server 130 translates information between the non-JMX Management Application 150 and MBeans 105,110, and 115.

Management Application 160 is a remote MBean Server. The remote MBean Server includes similar functions as MBean Server 130, including services for communicating with MBeans and Management Applications. Additionally, MBean Server 160 aggregates MBeans from Application Server 100 and Application Server 180. Information from MBean Server 160 may be passed to MBeans on Application Servers 100 and 180 directly, or through a local MBean Server. Any number of intermediate MBean Servers may exist in a distributed computing environment.

The JMX standard provides a uniform, Java™-based architecture for application and system management. In order to accommodate a wide variety of manageable resources, JMX defines a set of very generic interfaces for managing MBeans. For example, the code "void set Attribute(Object Identifier, Object attributes)" sets MBean attributes, while the code "Object get Attribute(Object Identifier, String attributeName)" would retrieve an MBean attribute.

The generic interface presented by the JMX standard is error prone on many levels. First, the correct objects and attributes used in a given method call will vary depending on the MBean called. Errors can result in several ways if the user application enters the incorrect objects or attributes when managing a MBean. If the user application misspells the name of the desired MBean or attribute, the method call will fail at runtime. Sometimes the user application will call a MBean method with a series of multiple attributes. If the attributes are miscounted or misordered, additional errors will result at runtime. Even if the user application configures the method call correctly, the user application could pass an invalid value for an attribute. For example, an attribute may have a valid numerical value between 1 and 10. A runtime error will result if the user application passes a value of 11 for this attribute.

Another problem results from using the wrong data type. Information used by MBean may be in the form of a specific data type. Examples of simple data types include strings and integers, which describe text and integer numbers, respectively. More complex data types are also used, such as ListenPort, which describes a servers network listen port setting. In the generic interface provided by the JMX standard, attributes are data typed with broad type of Object. It is up to the user application to ensure that this broad data type is handled properly. To do so, the user application must know in advance the more specific type of data used by the MBean and properly cast the specific data type. If this is done incorrectly, an error will result at runtime.

Additional problems occur due to the variety of information represented by MBeans. Many MBeans may represent manageable resources that are read-only. Examples of these attributes include server statistics, which can be read by the user application, but not written to. Other MBeans may be write-only. Examples of these manageable resources include operations for starting, stopping, and resetting application servers. Attempting to read a write-only MBean, or vice-versa, will result in an error.

Compounding this problem, many of these errors often occur only at runtime, after the application is deployed. This make debugging more time consuming, since the application must be deployed in order for the error to become apparent. Also, runtime error messages generally very vague, making it difficult to trace the source of the error.

Previously, the burden is on the user application to correctly employ MBeans with correctly named and ordered attributes, legal attribute values, and the correct data type. With the wide variety of MBeans, each with different requirements, user application mistakes are commonplace. Therefore, it is desirable to have an apparatus for employing MBeans which 1) prevents misnamed objects or attributes, 2) catches illegal attribute values, 3) avoids errors in casting data types, 4) prevents errors resulting from using the wrong function on a MBean, and 5) reduces the occurrence of difficult to trace runtime errors. Additionally, it is desirable that this apparatus is intuitive and easy to use. Further, it is desirable that this apparatus be dynamic, so that management interfaces may be extended at runtime.

SUMMARY OF THE INVENTION

According to the invention, generally, a proxy for controlling a management entity includes a strongly-typed user interface for communicating with a user application. The user interface defines a plurality of user functions for performing operations on specific portions of the management entity. The proxy includes a translator for converting user functions into at least one corresponding management function, and a management interface for communicating with the management entity through the corresponding management function.

Other embodiments and advantages of the present invention can be seen upon review of the figures, the detailed description, and the claims which follow.

BRIEF DESCRIPTION OF THE FIGURES

The present invention will now be described with reference to the drawings, in which.

The invention will be better understood with reference to the drawings and detailed description below. In the drawings, like reference numerals indicate like components.

DETAILED DESCRIPTION

The invention addresses the shortcomings of prior distributed computing environments by 1) preventing misnamed objects or attributes, 2) catching illegal attribute values prior to runtime 3) avoiding errors in casting data types, 4) preventing errors resulting from using the wrong function on a MBean, and 5) reducing the occurrence of difficult to trace runtime errors. Further, the invention provides an intuitive and easy to use MBean interface that is dynamically extendable at runtime.

Figure 1:
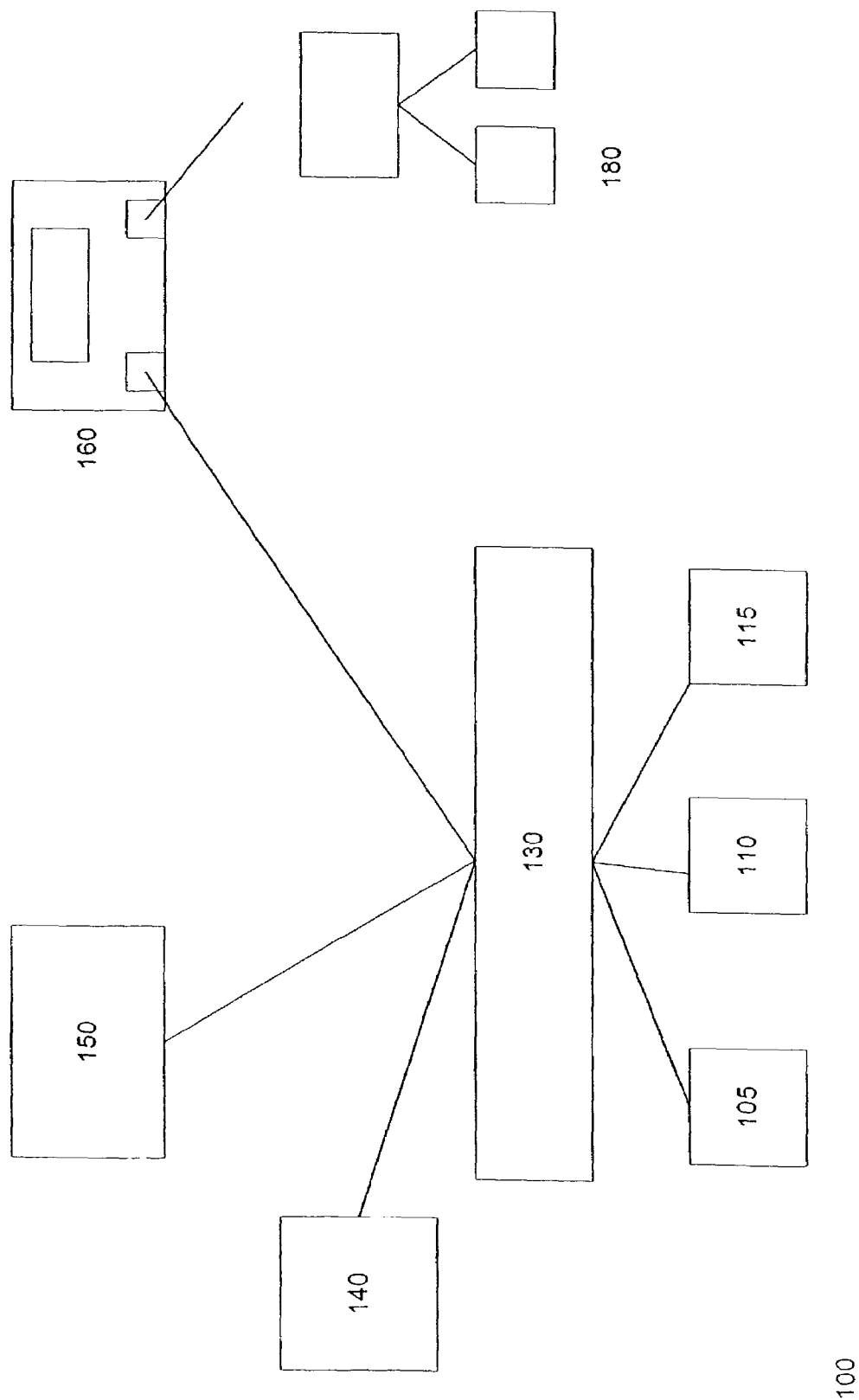
FIG. 1 illustrates the Java™ Management Extensions (JMX) architecture.
Figure 2:
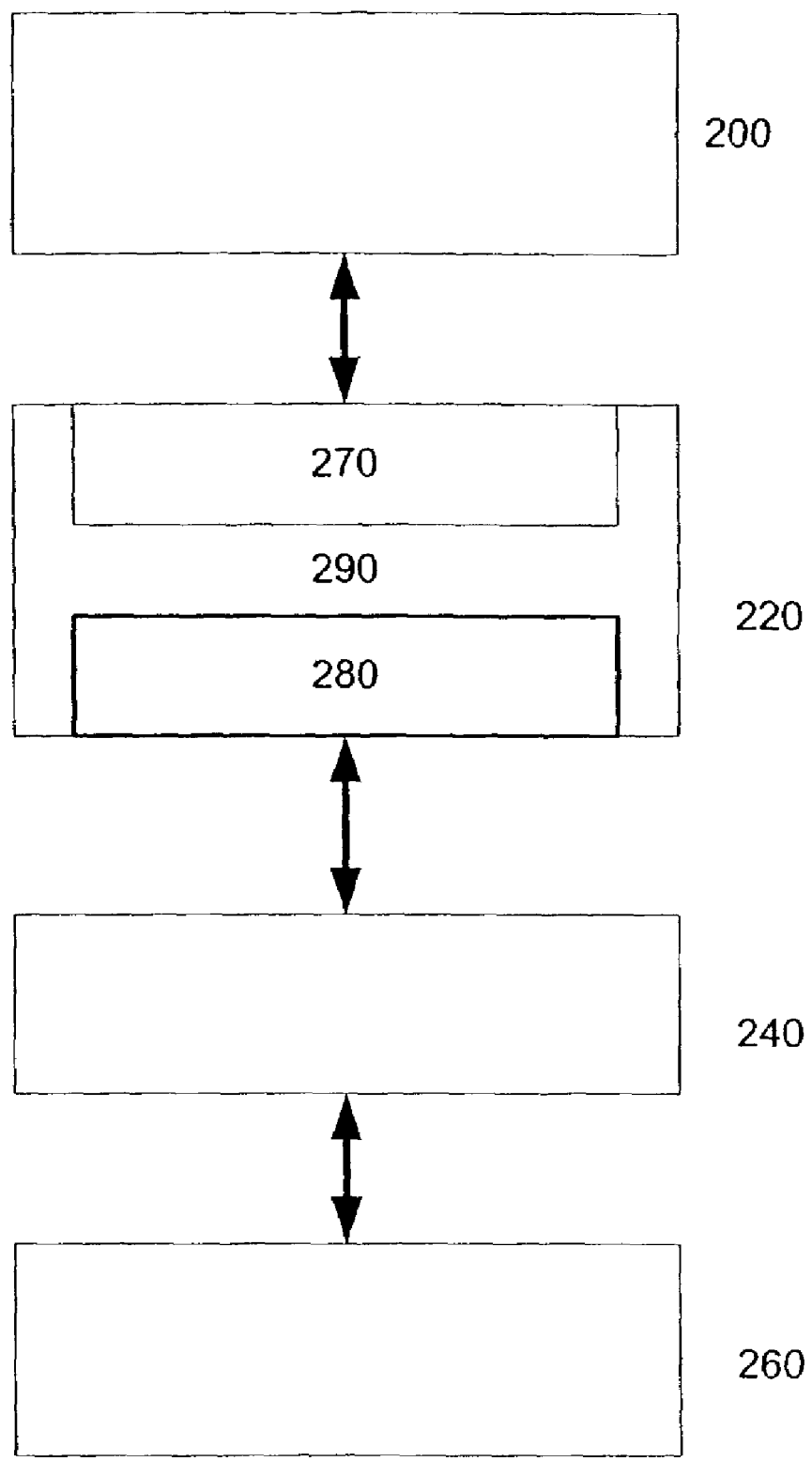
FIG. 2 illustrates the operation of a dynamic MBean proxy according to an embodiment of the invention.

An embodiment of the invention achieves these goals through the use of dynamic MBean proxies. MBean proxies serve as an intermediary between MBeans and the user application. FIG. 2 shows the operation of a MBean Proxy in a J2EE system. Information passes from the User application 200, through MBean Proxy 220, through one or more MBean Servers 240, to MBean 260.

Information is returned to the User 200 from MBean 260 along this same path. Unlike the standard generic JMX interface for accessing MBeans through an MBean Server, MBean Proxy 220 presents a Strongly-typed Interface 270 to User 200 and a Generic JMX Interface 280 to MBean Server 240. MBean Proxy also contains Code 290 for converting the methods of Strongly-typed Interface 270 into correctly formatted methods of the Generic JMX Interface 280.

Each MBean proxy represents a single MBean. This allows the interface of each MBean proxy to be customized according to the requirements of its corresponding MBean. In an embodiment, each MBean proxy is dynamically created when the user application first requests a specific MBean. Once a MBean proxy is created for a specific MBean, the MBean proxy becomes a persistent object. Additional MBean accesses are conducted through the previously created MBean proxy. Direct user access to the MBean is unnecessary, and the user may treat the MBean Proxy as if it were the MBean itself.

Dynamic MBean proxies eliminate many of the sources of error associated with the generic JMX interface. First, dynamic MBean proxies do not have errors from misnamed MBeans and attribute. In an embodiment, the user application must obtain each MBean Proxy through a name search prior to the initial access of the MBean proxy. The Java™ Naming and Directory Interface (JNDI) provides one type of name search. JNDI is a standard Java™ language extension for locating Java™ objects. If the name is misspelled, the name search will fail and the user application will be unable to attempt to access the nonexistent MBean proxy. If the name search is successful, then the MBean is guaranteed to exist and access may proceed normally.

Dynamic MBean proxies also avoid problems stemming from illegal attribute values. In an embodiment, each specific MBean interface is declared prior to compilation of the user application's code. For many attributes, this interface declaration also defines valid attribute values. If an illegal attribute value is passed prior to compilation, the compiler will catch this error. Illegal values passed at runtime will generate an illegal attribute exception, which can be handled by the user application.

Dynamic MBean proxies provide a strongly-typed interface which prevents a user application from erroneously passing attributes with the wrong data type. In an embodiment, each MBean proxy interface is declared prior to compilation. This interface declaration defines a specific data type for each MBean attribute. In order to pass data to a specific attribute through an MBean proxy, the data must be contained in the correct data type. This is done in the user application code by storing the data in an object of the correct data type or by converting or "casting" the data into the correct data type for the desired attribute. Attributes returned by MBeans must also be cast into the correct data type. Failing to correctly set data types in the user application code will prevent the source code from compiling. Once the user application has been successfully compiled, this embodiment ensures that the application will be free of runtime errors associated with wrong data types.

Further, the strongly-typed interface provided by dynamic MBean proxies prevents the user from calling the wrong function on an MBean. In an embodiment, each MBean Proxy interface is declared prior to compilation. Since each MBean interface is configured specifically for a given type of MBean, the MBean proxy interface declaration will only contain valid functions for a given MBean type. Invalid functions for a given MBean type are not defined by the MBean proxy interface. If the user application code attempts to call an invalid function for a given MBean, the application will not compile. Instead, the compiler will generate an error message pointing out that the requested function is not defined for a given MBean type. This eliminates runtime errors associated with invalid function calls.

In addition to preventing many types of errors, dynamic MBean proxies reduce the severity of errors when they occur. For many types of errors discussed above, MBean proxies will generate compiler errors when the user makes a mistake. In contrast, similar mistakes under the generic JMX interface will result in runtime errors. In general, these runtime errors are less specific and harder to trace than their corresponding compiler errors. Furthermore, the programmer saves time by detecting and eliminating many errors without having to deploy the application.

Dynamic MBean proxies also provide an intuitive and easy to use interface to MBeans. The strongly-typed interface of MBean proxies is structured similarly to the interface provided by Enterprise Java™ Beans. Since many Java™ programmers are already familiar with EJBs, MBean proxies make it easier for programmers to write user applications. It also allows Java™ programmers to access MBeans in a manner consistent with EJB, simplifying application development.

Figure 3:
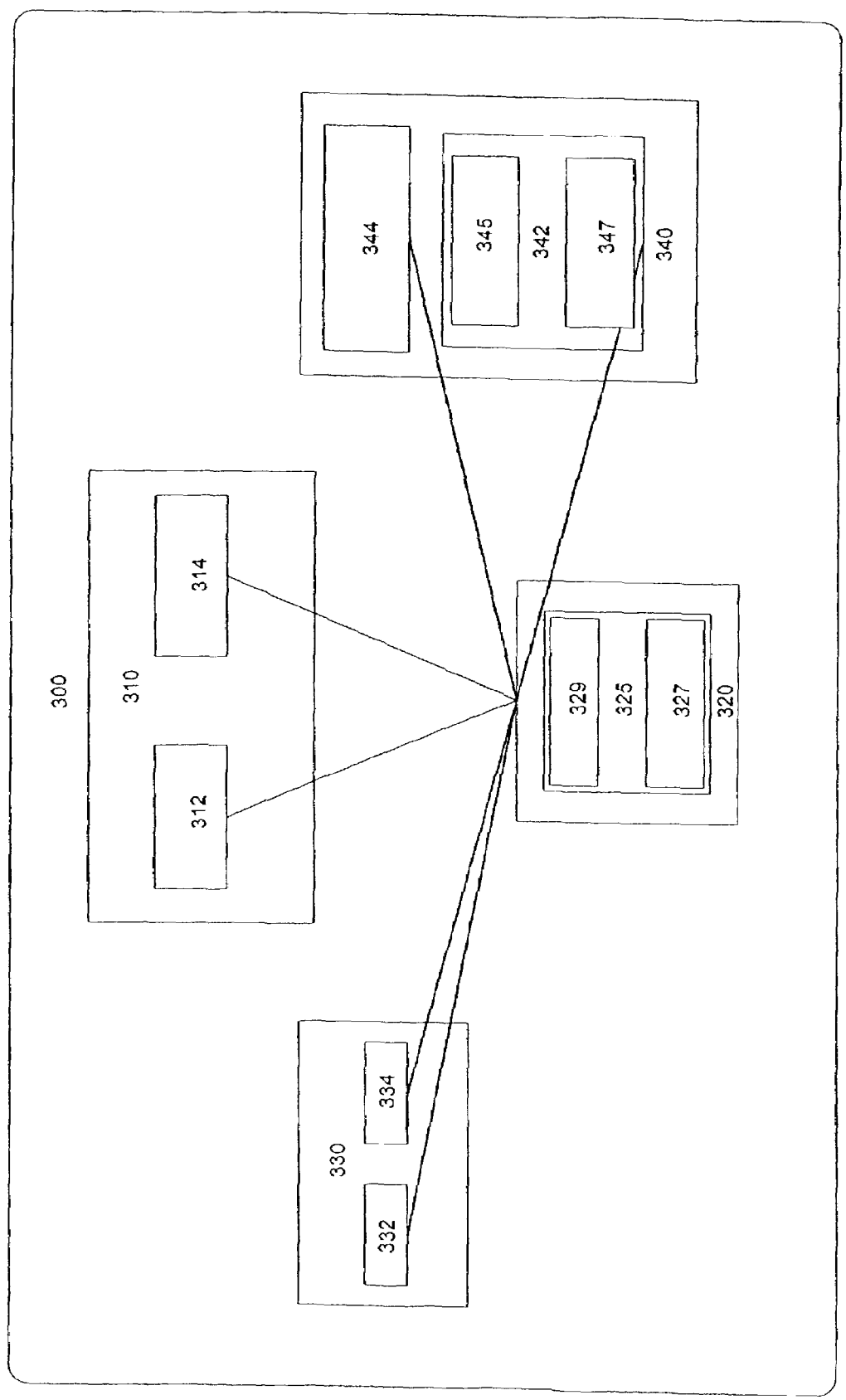
FIG. 3 illustrates a distributed computing environment incorporating an embodiment of the invention including MBean Servers for controlling MBeans and MBean Homes for creating dynamic MBean proxies.

In an embodiment, MBean proxies are created dynamically at runtime. This allows for seamless extension of management interfaces at runtime. MBean proxies are created by a special object known as an MBeanHome. FIG. 3 shows a distributed computing environment incorporating an embodiment of the invention including dynamic MBean proxies and several MBeanHomes.

The distributed computing environment 300 contains a plurality of computers 310, 320, 330, and 340. The four computers shown are for the purpose of illustration. A distributed computing environment may contain a single computer up to any number of computers. Each of the computers contains the underlying hardware and software necessary to operate in a distributed computing environment. This includes one or more processing devices, memory devices, data storage devices, communications devices, and any associated software. The usage of these hardware and software components in a distributed computing environment are well known in the art. Although not shown in FIG. 3, the distributed computing environment 300 may include communication connections for exchanging information with external systems external systems such as client computers, databases and other enterprise systems, monitoring systems, and data storage systems.

All of the computers in the distributed computing environment 300 are in communication with each other via communication link 350. Communication link 350 may be a computer network, such as a local area network or a wide area network, and may employ any type of communications technology capable of carrying information. The number and arrangement of the communication connections comprising communication link 350 shown in FIG. 3 is for purposes of illustration and communication link 350 may be configured in any suitable manner known in the art for connecting computers.

Computer 310 contains server programs 312 and 314. Each of these server programs is capable of independently executing one or more distributed applications or application components. Server programs 312 and 314 are shown in FIG. 3 for the purposes of illustration and computer 310 may contain a single server program up to any number of server programs. Similarly, computers 330 and 340 contain server programs 332, 334, 342, and 344, respectively. In an embodiment, each server program is a J2EE application server capable of executing one or more J2EE applications or application components.

Computer 320 contains an Admin Server program 325. The Admin Server 325 supervises the management of the entire distributed computing environment. Computer 320 may also contain other programs not shown in FIG. 3. In an embodiment, computer 320 contains an Admin Server 325 as well as one or more server programs, such as those discussed above.

In an embodiment, Server program 342 contains an MBean Server 345 and an MBeanHome 347. MBean Server 345 directly controls the MBeans located on Server Program 342. These MBeans correspond to management resources for applications on Server program 342 as well as management resources for Server program 342 itself. MBean Server 345 provides access to MBeans through the generic JMX interface. MBeanHome 347 creates dynamic MBean proxies for MBeans located on Server program 342. Both MBean Server 345 and MBeanHome 347 access the same set of MBeans. In a further embodiment, a MBean Servers and a MBeanHome are located on each Server Program in the distributed computing environment. Each MBean Server and MBeanHome enables access to all the MBeans on their respective Server Programs.

An additional embodiment includes MBean Server 327 and MBeanHome 329 on Admin Server 325. The MBean Server 327 and MBeanHome 329 enable access to the MBeans on Admin Server 325. These include MBeans for managing applications running on Admin Server 325 as well as MBeans for managing Admin Server 325. Unlike other MBean Servers and MBeanHomes, the MBean Server 327 and MBeanHome 329 on the Admin Server 325 further enable access to all the MBeans in the entire distributed computing environment 300.

In an embodiment, MBean proxies are created by the MBeanHome. The user can request a dynamic MBean proxy for a specific MBean from the MBeanHome. In response, the MBeanHome returns a dynamic MBean proxy to the user corresponding to the requested MBean. Alternatively, the user may employ the MBeanHome to search for MBeans meeting a specific criteria. Searches may be conducted by any combination of MBean attributes, MBean types, or MBean Servers. For example, a search could request MBeans for all servers using a listen port set to 7001. In response to a search request, the MBeanHome returns a group of MBean proxies matching the search request. In an embodiment, the group of MBean proxies are returned inside of a Java™ iterator object. The user then extracts each MBean proxy from the iterator.

Internally, an embodiment of the MBeanHome creates dynamic MBean proxies in the following manner. First, the MBeanHome receives a request from the user for a dynamic MBean proxy for a specific MBean. The MBeanHome makes a generic JMX call on the MBean Server requesting MBean information for the specific MBean.

Once the MBean information has been retrieved from the MBean Server, the MBeanHome examines the MBean information to determine the MBean type. Any MBean of a given type will have the same methods and attributes. The MBeanHome has access to data describing the methods and attributes available to each MBean type. By matching the MBean type to data on the attributes and methods available to each MBean type, the MBeanHome is able to determine all of the attributes and methods available for the specific Mbean.

Next, the MBeanHome selects an interface class for the requested MBean. The interface class defines a strongly-typed interface for the attributes and methods of the MBean. In an embodiment, the interface class enumerates all of the methods and attributes available to a specific MBean. The class interface defines the specific data types employed by each of the available methods and attributes. Additionally, the class interface specifies valid values for each attribute. In order to work with the class interface, the MBeanHome creates a class interface object, which is a Java™ object instantiating the class interface.

In addition to creating the class interface object, the MBeanHome creates an instance of an invocation handler object for this MBean. An invocation handler is an interface type standardized in Java™ 2 Platform, Standard Edition, v. 1.3, API Specification. This specification, available at http://java.sun.com/j2se/1.3.0/docs/api/overview-summary.html is incorporated by reference herein. Objects implementing this interface handle methods invoked on a proxy object. When a method is invoked on a particular proxy object, the method call is passed to the invoke method of the invocation handler defined for the proxy object. The invoke method must then parse the method call and perform the required action.

For the invocation handler associated with a specific MBean, the invoke method is capable of parsing each method and attribute available to the MBean. When a user invokes a method on the MBean proxy, the invoke method of the invocation handler parses the method and formulates one or more generic JMX calls in response. These generic JMX method calls are then invoked on the specified MBean via the MBean Server. The results of these generic JMX method calls, if any, are then returned to the invoke method of the invocation handler. The results are then cast into the data type specified by the interface, if necessary, and returned to the user.

A properly implemented invocation handler is needed for the correct operation of the MBean proxy. The invocation handler must implement every method and attribute of the MBean class interface in exactly the correct manner. Each method of the MBean class interface must be correctly parsed into the properly formatted JMX calls. Further, any data passing through the MBean proxy must be precisely cast into the correct data types. Failure to comply with these requirements will result in runtime errors. In this case, runtime errors will be concentrated in the invocation handler, rather than the user application. The invocation handler is typically developed by the Server program developer. Since the Server program developer is generally more careful and performs more product testing than the typical user, runtime errors are much less likely to occur.

Once the invocation handler and the class interface objects have been created, the MBeanHome is ready to create the MBean proxy. The MBean Proxy is created using a Java™ dynamic proxy factory method. The dynamic proxy factory combines the class interface object with the invocation handler object to create a proxy object. This proxy object implements the interface of the interface object with the functionality provided by the invocation handler. By combining the MBean-specific class interface object with the MBean invocation handler, the dynamic proxy factory produces an MBean proxy object. The completed MBean proxy is then returned to the user to enable future MBean access.

The following sample source code implements a dynamic proxy factory:

```
static public Object newInstance(Object obj, Class[ ] ClassInterfaces)
{
    return Java.lang.reflect.Proxy.newProxyInstance
        (obj.getClass( ).getClassLoader( ),   ClassInterfaces,   new
DynamicProxyClass(obj));
}
```

This dynamic proxy factory combines the interface defined by ClassInterfaces and the invocation handler defined by DynamicProxyClass to create a dynamic proxy.

In an alternate embodiment, the MBeanHome receives a search request from the user. The MBeanHome then performs this search in order to find all the MBeans matching the user's search criteria. The MBeanHome then makes a series of generic JMX calls on the MBean Server to retrieve MBean information for each MBean meeting the search criteria. The remaining steps of the MBean proxy creation are carried out as described above, with each step performed separately for each MBean matching the search criteria. In an embodiment, following the creation of all of the corresponding MBean proxies, the MBeanHome returns a single iterator object containing all of the created MBean proxy objects to the user. The user may then extract each MBean proxy from the iterator.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A proxy for controlling a Java management extensions (JMX) bean, said proxy comprising:
    a strongly typed application interface declared prior to compilation of an application for allowing the proxy to communicate with the application, wherein the application interface includes at least one application function associated with a specific management bean type;
    a function translator that receives an invocation of said application function from the application via the strongly typed application interface, parses the invocation and formulates at least one JMX generic interface call corresponding to the application function wherein the JMX generic interface call is disassociated from the specific management bean type; and
    a generic management interface that communicates with the Java management extensions (JMX) bean via corresponding JMX generic interface calls in order to invoke functionality in the JMX bean, said JMX bean receiving invocations of the JMX generic interface calls;
    wherein errors in the application code referring to the management bean type prevent the application from compiling rather than causing runtime errors such that the strongly typed interface prevents the application from erroneously passing attributes with a wrong data type to the JMX bean;
    wherein the proxy is dynamically generated at runtime to allow the application to invoke the management JMX bean while detecting at least one of: misnamed objects and attributes, illegal attribute values, errors in casting data types, and errors resulting from incorrect JMX generic interface calls; and
    wherein the proxy is stored in a computer-readable storage medium and executed by a processor.

2. The proxy of claim 1, wherein:
    each application function associated with the management JMX bean utilizes a specific data type associated with the management JMX bean.

3. The proxy of claim 1, wherein:
    the portion of the management JMX bean is a management attribute.

4. The proxy of claim 1, wherein:
    the portion of the management JMX bean is a management function.

5. The proxy of claim 1, wherein:
    the management JMX bean is a Java MBean.

6. The proxy of claim 5, wherein:
    the MBean is associated with a run-time operation.

7. The proxy of claim 5, wherein:
    the MBean is associated with a network resource.

8. The proxy of claim 1, wherein:
    the function translator and the management interface comprise a Java invocation handler.

9. The proxy of claim 1, wherein:
    the application is a management application.

10. The proxy of claim 1, wherein:
    the application is a MBean Server.

11. The proxy of claim 5, wherein:
    the management interface communicates management functions to the management entity via an MBean Server.

12. The proxy of claim 5, wherein:
    the management interface communicates management functions to the management JMX bean via an MBeanHome.

13. The proxy of claim 2, wherein:
    the management interface receives a data response to at least one of the communicated JMX generic interface calls from the management JMX bean;
    the function translator converts the data response to a specific data type utilized by the application function associated with the management JMX bean; and the application interface communicates the converted data response to the application via the application function.

14. A method for creating a proxy for controlling a Java management extensions (JMX) bean, said method comprising:
declaring a strongly typed interface class before compile time for specifying communications between the proxy and an application wherein the interface class is associated with a specific management bean type;
compiling the application such that errors in the application code referring to the management bean type prevent the application from compiling;
receiving a request for the proxy associated with the specific management bean type, the request received from the application at runtime;
retrieving entity information describing the JMX bean in response to the application request;
evaluating the entity information to determine a management bean type instantiated by the JMX bean; and
creating, at runtime, a proxy adapted to the specific management bean type and associated with the JMX bean by selecting the interface class associated with the management bean type as determined and instantiating an interface object for allowing the proxy to communicate with the application wherein the proxy allows the application to invoke the JMX bean while detecting at least one of: misnamed objects and attributes, illegal attribute values, errors in casting data types, and errors resulting from incorrect JMX generic interface calls;
receiving a method invocation to the proxy via the strongly typed interface class, said method invocation received from the application;
parsing the method invocation received via the strongly typed interface class and formulating one or more JMX generic interface calls disassociated from the specific management bean type such that the strongly typed interface class prevents the application from erroneously passing attributes with a wrong data type to the JMX bean; and
invoking the one or more JMX generic interface calls on the JMX bean.

15. The method of claim 14, wherein creating a proxy further includes:
creating an instance of an invocation handler associating at least the applicationinterface with the JMX generic interface; and
invoking a proxy creation method on at least the instance of the invocation handler and the interface class object to create a proxy object associated with the management bean.

16. The method of claim 14, wherein:
the application request specifies a management bean.

17. The method of claim 16, further comprising the step of:
returning the proxy object to the application.

18. The method of claim 14, wherein:
the application request specifies the value of at least one management attribute.

19. The method of claim 18, wherein retrieving entity information further comprises:
locating management beans having the specified management attribute; and
retrieving entity information for a located management bean matching the value of the specified management attribute.

20. The method of claim 19, further comprising the step of:
returning the proxy object to the application in an iterator.

21. The method of claim 14, wherein:
the management bean is a Java MBean.

22. The method of claim 21, wherein:
the MBean is associated with a run-time operation.

23. The method of claim 21, wherein:
the MBean is associated with a network resource.

24. The method of claim 21, wherein:
the entity information is retrieved from an MBean Server.

25. A system for managing services of a distributed processing system, comprising:
A Java management extensions (JMX) bean of a specific management bean type associated with a service of the distributed processing system and having a generic Java Management Extensions (JMX) interface that is adapted to communicate in general data types disassociated from the specific management bean type;
a strongly typed application interface associated with the specific management bean type and implemented by an application such that naming and type errors in the application code referring to the JMX bean prevent the application from compiling; and
a management proxy created at runtime for communicating information between the JMX bean and the application, wherein communication with the JMX bean is via the generic JMX interface, and wherein communication with the application is via the application interface; and
wherein the management proxy receives one or more calls from the application via the strongly typed interface and converts calls on the application interface which are specific to the management bean type into calls to the generic JMX interface that are disassociated from the specific management bean type in order to access functionality in the JMX bean such that the strongly typed interface prevents the application from erroneously passing attributes with a wrong data type to the JMX bean;
wherein the proxy is dynamically generated at runtime to allow the application to invoke the JMX bean while detecting at least one of: misnamed objects and attributes, illegal attribute values, errors in casting data types, and errors resulting from incorrect JMX generic interface calls; and
wherein the management proxy is stored in a computer-readable storage medium and executed by a processor.

26. The system of claim 25, wherein:
the generic JMX interface includes at least one management entity function disassociated with the specific management bean type; and
the application interface includes at least one application function associated with the specific management bean type.

27. The system of claim 26, wherein:
the communication via the generic JMX interface utilizes the management bean function; and
the communication via the application interface utilizes the application function.

28. The system of claim 26, wherein:
the application function utilizes a specific data type associated with the specific management bean.

29. The system of claim 28, wherein:
the management bean function utilizes a general data type disassociated with the specific management entity.

30. The system of claim 29, wherein:
the management proxy converts information to the general data type for communication with the management bean; and the management proxy converts information to the specific data type for communication with the application.

31. The system of claim 25, further comprising:
a management bean handler for communicating information between the management bean and the management entity proxy.

32. The system of claim 31, wherein:
the management bean handler is comprised of a Java MBean Server.

33. The system of claim 32, wherein:
the management bean handler is further comprised of an MBeanHome.

34. The system of claim 25, wherein:
the service of the distributed processing system associated with the management bean is a management attribute.

35. The system of claim 25, wherein:
the service of the distributed processing system associated with the management bean is a management function.

36. The system of claim 25, wherein:
the management bean is a Java MBean.

37. The system of claim 36, wherein:
the service of the distributed processing system is a runtime operation.

38. The system of claim 36, wherein:
the service of the distributed processing system is a network resource.

39. The system of claim 36, wherein:
the management proxy includes a Java invocation handler.

40. The system of claim 36, wherein:
the application is an MBean Server.

* * * * *

UNITED STATES PATENT AND TRADEMARK OFFICE
CERTIFICATE OF CORRECTION

| | | |
|---|---|---|
| PATENT NO. | : 7,433,917 B2 | Page 1 of 1 |
| APPLICATION NO. | : 10/255422 | |
| DATED | : October 7, 2008 | |
| INVENTOR(S) | : Renaud | |

It is certified that error appears in the above-identified patent and that said Letters Patent is hereby corrected as shown below:

In column 1, line 47, delete "2platform," and insert -- 2 Platform, --, therefor.

In column 1, line 54, delete "http:/java." and insert -- http://java. --, therefor.

In column 3, line 37, delete "105,110," and insert -- 105, 110, --, therefor.

In column 3, line 52, delete "set Attribute" and insert -- setAttribute --, therefor.

In column 3, line 54, delete "get Attribute" and insert -- getAttribute --, therefor.

In column 5, line 7, delete "MBean Homes" and insert -- MBeanHomes --, therefor.

In column 11, line 46, in claim 15, delete "applicationinterface" and insert -- application interface --, therefor.

In column 12, line 63, in claim 29, delete "entity." and insert -- bean. --, therefor.

Signed and Sealed this

Thirteenth Day of April, 2010

David J. Kappos
*Director of the United States Patent and Trademark Office*